(12) United States Patent
Vandehey et al.

(10) Patent No.: US 8,788,586 B1
(45) Date of Patent: Jul. 22, 2014

(54) METHOD AND SYSTEM FOR PUBLISHING A WEBSITE

(75) Inventors: Jeremy Gerard Vandehey, San Francisco, CA (US); Saravanan Coimbatore, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 98 days.

(21) Appl. No.: 13/358,341

(22) Filed: Jan. 25, 2012

(51) Int. Cl.
*G06F 15/16* (2006.01)
*G06F 17/30* (2006.01)
*H04N 21/25* (2011.01)
*H04N 21/475* (2011.01)
*G06Q 50/00* (2012.01)

(52) U.S. Cl.
CPC ...... *G06F 17/3089* (2013.01); *G06F 17/30038* (2013.01); *G06F 17/30867* (2013.01); *H04N 21/252* (2013.01); *H04N 21/4756* (2013.01); *G06Q 50/01* (2013.01)
USPC .......................................... 709/204; 705/319

(58) Field of Classification Search
CPC .................. G06F 17/30038; G06F 17/30867; G06F 17/3089; H04N 21/252; H04N 21/4756; G06Q 50/01
USPC ................. 709/204–207; 715/733–748, 753, 715/758–759; 707/706, 722–734, 770–771, 707/776; 705/7.29–7.34, 319
See application file for complete search history.

(56) References Cited

U.S. PATENT DOCUMENTS

| | | | |
|---|---|---|---|
| 2002/0138513 A1* | 9/2002 | Korotney et al. | 707/511 |
| 2006/0253316 A1* | 11/2006 | Blackshaw et al. | 705/10 |
| 2007/0055694 A1* | 3/2007 | Ruge et al. | 707/104.1 |
| 2008/0010131 A1* | 1/2008 | Bridges et al. | 705/14 |
| 2008/0046327 A1* | 2/2008 | Schnietz | 705/26 |
| 2008/0133500 A1* | 6/2008 | Edwards et al. | 707/5 |
| 2008/0294625 A1* | 11/2008 | Takeuchi | 707/5 |
| 2010/0042608 A1* | 2/2010 | Kane, Jr. | 707/5 |
| 2010/0205551 A1* | 8/2010 | Underwood et al. | 715/760 |

(Continued)

FOREIGN PATENT DOCUMENTS

WO WO 2009050529 A2 * 4/2009
WO WO 2012097458 A1 * 7/2012

OTHER PUBLICATIONS (Catone, Josh, Social Media 9 Web Apps for Gathering Customer Feedback, Mar. 6, 2011, Mashable.com, http://mashable.com/2011/03/06/user-feedback-apps/, p. 2-12).*

(Continued)

*Primary Examiner* — Brian J Gillis
*Assistant Examiner* — Michael A Keller
(74) *Attorney, Agent, or Firm* — Osha Liang LLP

(57) ABSTRACT

A method for publishing a website, including receiving, from a business, a request for a modification recommendation relating to a content of the website, generating, in response to receiving the request, a post including a name of the business, a business owner name, and a link to a recommendation page, publishing, using a social network application, the post to a newsfeed in a social network, where a plurality of users in the social network subscribe to the newsfeed, receiving, in response to publishing the post and from the plurality of users, a plurality of recommendations for the content of the website from the recommendation page, presenting, to the business, the plurality of recommendations, receiving, from the business, a selection of one or more website recommendations from the plurality of recommendations, and publishing the website including the one or more website recommendations.

21 Claims, 8 Drawing Sheets

(56) References Cited

U.S. PATENT DOCUMENTS

| | | | | |
|---|---|---|---|---|
| 2010/0318442 | A1* | 12/2010 | Paul et al. | 705/26.5 |
| 2011/0022537 | A1* | 1/2011 | Nickerson et al. | 705/347 |
| 2011/0246277 | A1 | 10/2011 | Neldurg et al. | |
| 2011/0282888 | A1* | 11/2011 | Koperski et al. | 707/752 |
| 2011/0302145 | A1 | 12/2011 | Brown et al. | |
| 2012/0047211 | A1* | 2/2012 | Hughes | 709/204 |
| 2012/0089429 | A1* | 4/2012 | Geddes et al. | 705/7.11 |
| 2012/0123891 | A1* | 5/2012 | Patel | 705/26.2 |
| 2012/0290553 | A1 | 11/2012 | England et al. | |
| 2013/0007238 | A1* | 1/2013 | Sandholm | 709/223 |
| 2013/0054693 | A1 | 2/2013 | Chennamadhavuni | |
| 2013/0117131 | A1* | 5/2013 | Robinson et al. | 705/14.72 |

OTHER PUBLICATIONS (Herngaard, Anne, How to Improve Your News Feed Ranking on Facebook, Sep. 6, 2011, MindJumpers Social Media Management, http://www.mindjumpers.com/blog/2011/09/newsfeed-on-facebook/, p. 1-2).*

(Jason, Search Engineer, Yelp Top 10 Restaurants of 2010!, Jan. 4, 2011, Yelp Web Log "Reaching for the fifth star", http://officialblog.yelp.com/2011/01/yelp-top-10-restaurants-of-2010.html, p. 1-2).*

(Deatch, Katie, Facebook meets customer reviews—A new service lets e-retailers use shoppers' Facebook profiles to help sell products, Sep. 17, 2010, Social Media Internet Retailer, http://www.internetretailer.com/2010/09/17/facebook-meets-customer-reviews, p. 1-2).*

(Harmon, Stacy, Facebook's Wall vs. News Feed Explained, Sep. 30, 2011, Harmon Enterprises, http://www.harmonenterprises.com/coaching/facebooks-wall-vs-news-feed-explained/, p. 1).*

(Mokbel, Mohamed, F., Personalization, Socialization, and Recommendations in Location-based Services 2.0, Department of Computer Science and Engineering, University of Minnesota, Minneapolis, 2011, p. 1-6).*

(Suto, Wendy, Top 13 Must-have Facebook Application for Business, Oct. 14, 2010, Site Pro News, http://www.sitepronews.com/2010/10/14/top-13-must-have-facebook-applications-for-business/, p. 1-2).*

(Weinberg, Tamar, How to Use Facebook for Business and Marketing, 2010, Techipedia, http://www.techipedia.com/2010/how-to-use-facebook-for-business-and-marketing/, p. 1-12).*

Hines (Hines, Kristi, How to Set Up a Google+Page For Your Business, Nov. 14, 2011 retrieved from http://www.socialmediaexaminer.com/how-to-set-up-a-google-page-for-your-business/).*

Marketingdonut.co.uk, "Keyword research—a beginner's guide/Marketing Donut," http://www.marketingdonut.co.uk/marketing/internet-marketing/keyword-research-a-begginer-s-guide, Nov. 28, 2011 (11 pages).

* cited by examiner

Recommendation Page 400

Jeremy, you can really help Mr. Smith out. By completing the following form, you'll give Mr. Smith sweet ideas for his website and get him that much closer to publishing his site. You can be proud of the fact that you helped Mr. Smith get his site up and running! Complete the following fields and Mr. Smith will be sent your recommendations!

In 3-5 sentences, how would you describe Mr. Smith's business?

Field A 402

What should the tagline of Mr. Smith's business be?

Field B 404

What should Mr. Smith choose as a domain name (up to 3)?

Field C 406

Field D 408

Field E 410

What terms would you use to search for Mr. Smith's business in a search engine?

Field F 412

What are some of your favorite products or services that Mr. Smith offers?

Field G 414

Write a review of Mr. Smith's business:

Field H 416

Upload an image or browse our library to select an image that best describes Mr. Smith's business: Choose File 418  Library 420

FIG. 4

Mr. Smith's Website 700

Since 1922, Mr. Smith's world famous Design Business has designed and manufactured modern accessories for the contemporary lifestyle....

...

Mr. Smith's Website 705

Since 1922, Mr. Smith's world famous Design Business has designed and manufactured modern accessories for the contemporary lifestyle....

...

If you're looking for functional yet sleek design elements for your living space, Mr. Smith's Design Business is a great choice.

FIG. 7

METHOD AND SYSTEM FOR PUBLISHING A WEBSITE

BACKGROUND

Businesses often use websites to market products and/or services to consumers. The development and/or upkeep of a business website typically requires the business to hire website developers or designers that will develop content for the website that best markets and distributes the products and/or services of the business. This development and/or upkeep may require a substantial investment of time, energy, and capital on the part of the business.

SUMMARY

In general, in one aspect, the invention relates to a method for publishing a website, including receiving, from a business, a request for a modification recommendation relating to a content of the website, generating, in response to receiving the request, a post including a name of the business, a business owner name, and a link to a recommendation page, publishing, using a social network application, the post to a newsfeed in a social network, where a plurality of users in the social network subscribe to the newsfeed, receiving, in response to publishing the post and from the plurality of users, a plurality of recommendations for the content of the website from the recommendation page, presenting, to the business, the plurality of recommendations, receiving, from the business, a selection of one or more website recommendations from the plurality of recommendations, and publishing the website including the one or more website recommendations.

In general, in one aspect, the invention relates to a system for publishing a website, including a processor; a social website publishing application executing the on the processor and configured to receive, from a business, a request for a modification recommendation relating to a content of the website, generate, in response to receiving the request, a post including a name of the business, a business owner name, and a link to a recommendation page, publish, using a social network application, the post to a newsfeed in a social network, where a plurality of users in the social network subscribe to the newsfeed, receive, in response to publishing the post and from the plurality of users, a plurality of recommendations for the content of the website from the recommendation page, present, to the business, the plurality of recommendations, receive, from the business, a selection of one or more website recommendations from the plurality of recommendations, and publish the website including the one or more website recommendations.

In general, in one aspect, the invention relates to a non-transitory computer readable storage medium storing instructions for publishing a website, the instructions executable on a processor and including functionality for receiving, from a business, a request for a modification recommendation relating to a content of the website, generating, in response to receiving the request, a post including a name of the business, a business owner name, and a link to a recommendation page, publishing, using a social network application, the post to a newsfeed in a social network, where a plurality of users in the social network subscribe to the newsfeed, receiving, in response to publishing the post and from the plurality of users, a plurality of recommendations for the content of the website from the recommendation page, presenting, to the business, the plurality of recommendations, receiving, from the business, a selection of one or more website recommendations from the plurality of recommendations, and publishing the website including the one or more website recommendations.

Other aspects of the invention will be apparent from the following description and the appended claims.

BRIEF DESCRIPTION OF DRAWINGS

FIGS. 3-7 show diagrams of examples in accordance with one or more embodiments of the invention.

DETAILED DESCRIPTION

Figure 1:
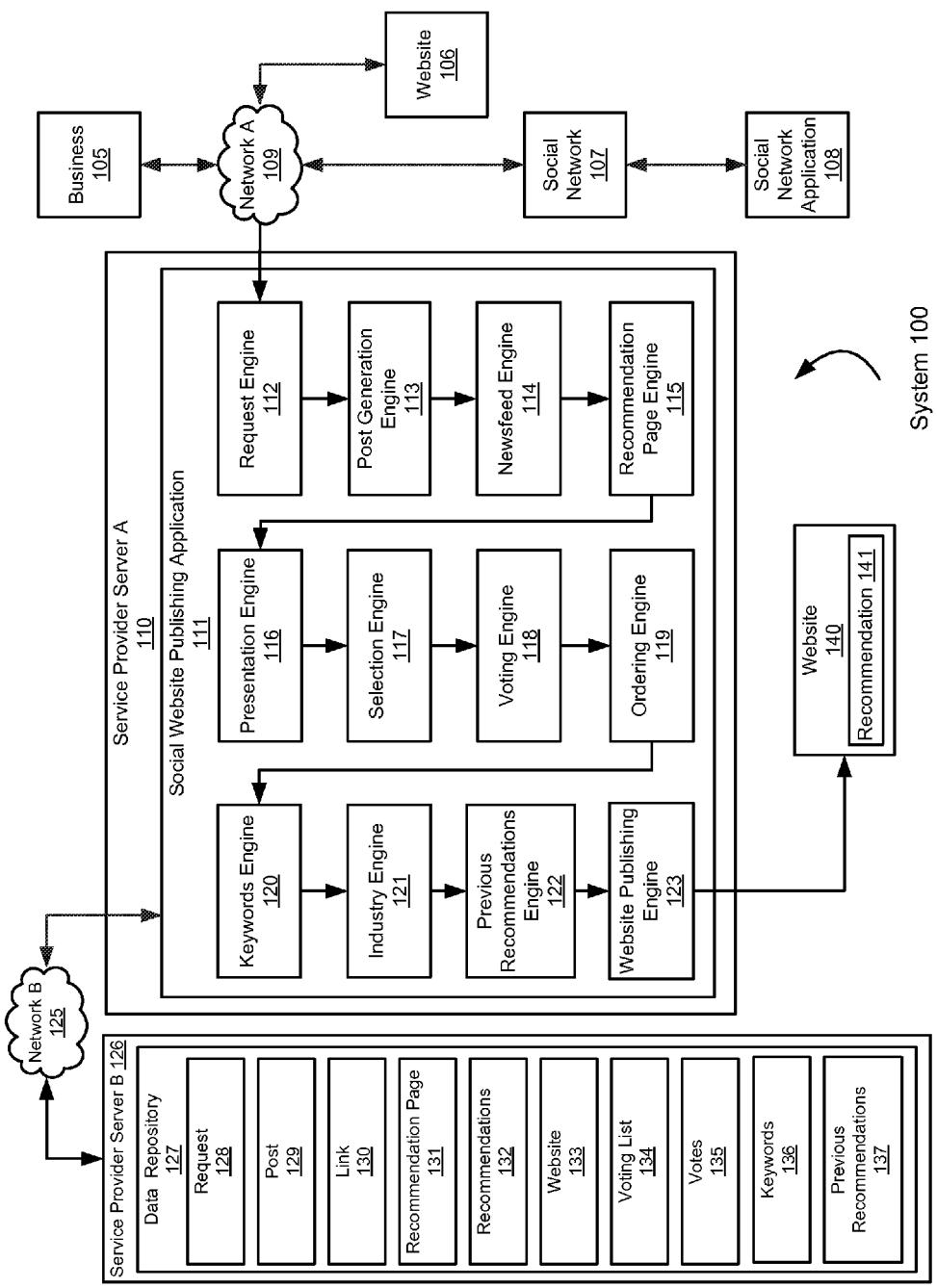
FIG. 1 shows a system diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for publishing a website. Specifically, the system or method may receive a request from a business for a recommendation pertaining to the business's website, generate a post including a link to a recommendation page, publish the post to a newsfeed in a social network, receive recommendations from users in the social network via the recommendation page, present the recommendations to the business, receive a selection of a recommendation from the business, and publish the website of the business including the recommendation originating from the users of the social network.

FIG. 1 shows a system (100) in accordance with one or more embodiments of the invention. As shown in FIG. 1, the system (100) includes components such as a social website publishing application (111) and a data repository (127). These components are described below and may be located on the same device (e.g. a server, mainframe, desktop Personal Computer (PC), laptop, Personal Digital Assistant (PDA), telephone, mobile phone, kiosk, cable box, and any other device), such as described in relation to FIG. 8 below, or may be located on separate devices connected by a network (e.g. the Internet, a wide area network (WAN), or a local area network (LAN)), with wired and/or wireless segments. In one or more embodiments of the invention, there may be more than one social website publishing application, and data repository running on a device, as well as more than one business, website, and social network interfacing with those components.

In one or more embodiments of the invention, a business (105) provides products and/or services to consumers. The business (105) may be the owner of a website (106) which the business (105) uses to market and sell products and/or services to consumers. The business (105) may also be a member of a social network (107). A social network (107) is an online social community made up of individuals, organizations, or businesses, which are connected by one or more specific types of interdependency, such as friendship, kinship, common interest, financial exchange, or relationships of beliefs, knowledge, or background. Customers of the business (105) may also be members of the social network (107), and may "follow" the business (105). When a first member "follows" a second member, the first member is a subscriber of a newsfeed of the second member, and receives any posts that the second member may publish to its newsfeed. Therefore, a newsfeed allows for the real-time dissemination of information by a member to followers.

When the business (105) wants to create or update its website (106), the business may enlist the aid of followers of the business (105) in the social network (107). Specifically, the business (105) may request the recommendations of its followers and/or network in the social network (107), and the followers and/or network of the business (105) in the social network (107) may provide recommendations for creating and/or modifying the website (106) to improve the website (105) as a marketing and distribution tool, through a social network application (108). Subsequently, the business (105) may incorporate one or more of the recommendations provided by the members of the social network (107) to generate or modify a website (105). Those skilled in the art will appreciate that there may be various other means by which a business (105) may enlist the aid of members of a social network (107) to generate or improve a website (106).

In one or more embodiments of the invention, a service provider server A (110) is configured to host the social website publishing application (111), which is configured to publish a website. The social website publishing application (111) is a software application that includes several engines configured to perform specific functions to publish a website. Specifically, engines operating as part of the social website publishing application (111) may include functionality to receive a request from a business for a recommendation, generate a post including a link to a recommendation page, publish the post to a newsfeed in a social network, receive recommendations from the recommendation page, present the recommendations to a business, receive a selection of a recommendation from the business, publish the website including the recommendation, and perform other calculations associated with publishing the website.

The social website publishing application (111) may receive input from various sources, including a business (105), and a social network (107). The social website publishing application (111) may store data in and/or access data from a data repository (127). The service provider server A (110), the social website publishing application (111), and other data stored on the service provider server A (110) may be owned and/or operated by a service provider (e.g. the owner, developer, and/or manager of the social website publishing application (111)). The social website publishing application (111) may include engines such as a request engine (112), a post generation engine (113), a newsfeed engine (114), a recommendation page engine (115), a presentation engine (116), a selection engine (117), a voting engine (118), an ordering engine (119), a keywords engine (120), an industry engine (121), a previous recommendations engine (122), and a website publishing engine (123). Each engine of the social website publishing application (111) is described below. Those skilled in the art will appreciate that each of the engines described may have other functionality beyond that disclosed, and that the functionality of each engine may alternatively be performed by any of the other engines.

In one or more embodiments of the invention, a request engine (112) is configured to receive a request from a business (105) for a recommendation. The request may be received from the business (105) through various means, such as a text or email from a mobile phone or computer. A recommendation includes content for a website of a business and is generated by a user of a social network. After receiving the request, the request engine (112) may process (i.e. modify, transform, format) the request, and then transmit the request to a post generation engine (113) for further processing. In parallel, the request engine (112) may pass control of the system (100) to any other engine. Those skilled in the art will appreciate that the request engine (112) may receive the request from other entities beyond the business (105), and may perform other functions beyond those disclosed.

In one or more embodiments of the invention, a post generation engine (113) is configured to generate a post including a link to a recommendation page. A post is an entry in a newsfeed of a business in a social network, and a recommendation page is a website and/or page within a social network that allows users in the social network to provide recommendations to the business. After generating a post, the post generation engine (113) may process (i.e. modify, transform, format) the post, and then transmit the post to a newsfeed engine (114) for further processing. In parallel, the post generation engine (113) may pass control of the system (100) to any other engine. Those skilled in the art will appreciate that the post generation engine (113) may perform other functions beyond those disclosed.

In one or more embodiments of the invention, a newsfeed engine (114) is configured to publish the post to a newsfeed in a social network. A newsfeed is a distribution mechanism in a social network that allows a user to disseminate information to followers. The newsfeed engine (114) may receive the post from the post generation engine (113). After publishing the post, the newsfeed engine (114) may process (i.e. modify, transform, format) the post, and then transmit the post to a recommendation page engine (115) for further processing. In parallel, the newsfeed engine (114) may pass control of the system (100) to any other engine. Those skilled in the art will appreciate that the newsfeed engine (114) may receive the post from other entities beyond the post generation engine (113), and may perform other functions beyond those disclosed.

In one or more embodiments of the invention, a recommendation page engine (115) is configured to receive recommendations from the recommendation page. The recommendations may be text, images, links, or another format. After receiving the recommendations, the recommendation page engine (115) may process (i.e. modify, transform, format) the recommendations, and then transmit the recommendations to a presentation engine (116) for further processing. In parallel, the recommendation page engine (115) may pass control of the system (100) to any other engine. Those skilled in the art will appreciate that the recommendation page engine (115) may receive the recommendations from other entities beyond the recommendation page, and may perform other functions beyond those disclosed.

In one or more embodiments of the invention, a presentation engine (116) is configured to present the recommendations to a business. The recommendations may be presented to the business by any suitable means, such as through a report that is distributed to the business in an email, or in the system (100). After presenting the recommendations, the presentation engine (116) may process (i.e. modify, transform, format) the presentation of the recommendations, and then transmit control of the system (100) to a selection engine (117) for further processing. In parallel, the presentation engine (116) may pass control of the system (100) to any other engine.

Those skilled in the art will appreciate that the presentation engine (116) may perform other functions beyond those disclosed.

In one or more embodiments of the invention, a selection engine (117) is configured to receive a selection of a recommendation from the business (105). The selection is an identification of which recommendation or recommendations are to be incorporated into a website of the business. After receiving the selection, the selection engine (117) may process (i.e. modify, transform, format) the selection, and then transmit the selection to a website publishing engine (123) for further processing. In parallel, the selection engine (117) may pass control of the system (100) to any other engine. Those skilled in the art will appreciate that the selection engine (117) may receive the selection from other entities beyond the business (105), and may perform other functions beyond those disclosed.

In one or more embodiments of the invention, a voting engine (118) is configured to generate a voting list including recommendations, publish the voting list to a newsfeed, and receive votes for the recommendations from users of the social network. A voting list is a list of items (e.g. recommendations) that allow users in a social network to submit votes for one or more of the items. After performing these actions, the voting engine (118) may process (i.e. modify, transform, format) the votes, and then transmit the votes to an ordering engine (119) for further processing. In parallel, the voting engine (118) may pass control of the system (100) to any other engine. Those skilled in the art will appreciate that the voting engine (118) may perform other functions beyond those disclosed.

In one or more embodiments of the invention, an ordering engine (119) is configured to order recommendations according to votes, generate an ordered list including the ordered recommendations, and present the ordered list to the business. An ordered list is a list that includes recommendations that are arranged in an order determined by the number of votes that they received, or another metric. After performing these actions, the ordering engine (119) may process (i.e. modify, transform, format) the ordered list, and then transmit control of the system (100) to a keywords engine (120) for further processing. In parallel, the ordering engine (119) may pass control of the system (100) to any other engine. Those skilled in the art will appreciate that the ordering engine (119) may perform other functions beyond those disclosed.

In one or more embodiments of the invention, a keywords engine (120) is configured to receive keywords relating to a request. Keywords may be any words that provide information about a request. The keywords engine (120) may receive the keywords from the business (105) and/or the social network (107). After receiving the keywords, the keywords engine (120) may process (i.e. modify, transform, format) the keywords, and then transmit the keywords to an industry engine (121) for further processing. In parallel, the keywords engine (120) may pass control of the system (100) to any other engine. Those skilled in the art will appreciate that the keywords engine (120) may receive the keywords from other entities beyond the business (105) and/or the social network (107), and may perform other functions beyond those disclosed.

In one or more embodiments of the invention, an industry engine (121) is configured to identify an industry of a business, and identify businesses in the industry. An industry is a sector in which the business sells goods and/or services (e.g. telecommunications, hardware, software). After performing these actions, the industry engine (121) may process (i.e. modify, transform, format) the industry and/or businesses, and then transmit the information to a previous recommendations engine (122) for further processing. In parallel, the industry engine (121) may pass control of the system (100) to any other engine. Those skilled in the art will appreciate that the industry engine (121) may perform other functions beyond those disclosed.

In one or more embodiments of the invention, a previous recommendations engine (122) is configured to obtain previous recommendations using keywords, and generate recommendations using the previous recommendations. Previous recommendations are recommendations that were previously generated and stored in the system (100). The previous recommendations engine (122) may obtain the previous recommendations from the data repository (127). After generate recommendations using the previous recommendations, the previous recommendations engine (122) may process (i.e. modify, transform, format) the recommendations, and then transmit the recommendations to a website publishing engine (123) for further processing. In parallel, the previous recommendations engine (122) may pass control of the system (100) to any other engine. Those skilled in the art will appreciate that the previous recommendations engine (122) may obtain the previous recommendations from other entities beyond the data repository (127), and may perform other functions beyond those disclosed.

In one or more embodiments of the invention, a website publishing engine (123) is configured to publish the website including the recommendation. Publishing the website pushes the website out to a live network (i.e. the Internet). After publish the website including the recommendation, the website publishing engine (123) may process (i.e. modify, transform, format) the website, and then pass control of the system (100) to any other engine. Those skilled in the art will appreciate that the website publishing engine (123) may perform other functions beyond those disclosed.

In one or more embodiments of the invention, the service provider server B (126) is configured to host a data repository (127). The data repository (127) may contain data associated with the social website publishing application (111). The data repository (127) may be a relational database that stores data entries associated with the social website publishing application (111). The data repository (127) may also be a spreadsheet containing data cells associated with the social website publishing application (111). In one or more embodiments of the invention, the data repository (127) may be implemented with many technologies. The data repository (127) may receive data from various sources, including the social website publishing application (111), and any of the engines of the social website publishing application (111), over a network B (125). After receiving data from the social website publishing application (111), the data repository (127) may process (i.e. modify, transform, format) the data, and then store the data. The data may include a request (128), a post (129), a link (130), a recommendation page (131), recommendations (132), a website (133), a voting list (134), votes (135), keywords (136), and previous recommendations (137). Those skilled in the art will appreciate that the data repository (127) may receive and store data from other entities beyond the social website publishing application (111), and may perform other functions beyond those disclosed. Further, the service provider server B (126), and the data stored on this server may be owned and/or operated by a service provider (e.g. the owner, developer, and/or manager of the social website publishing application (111)).

Figure 2:
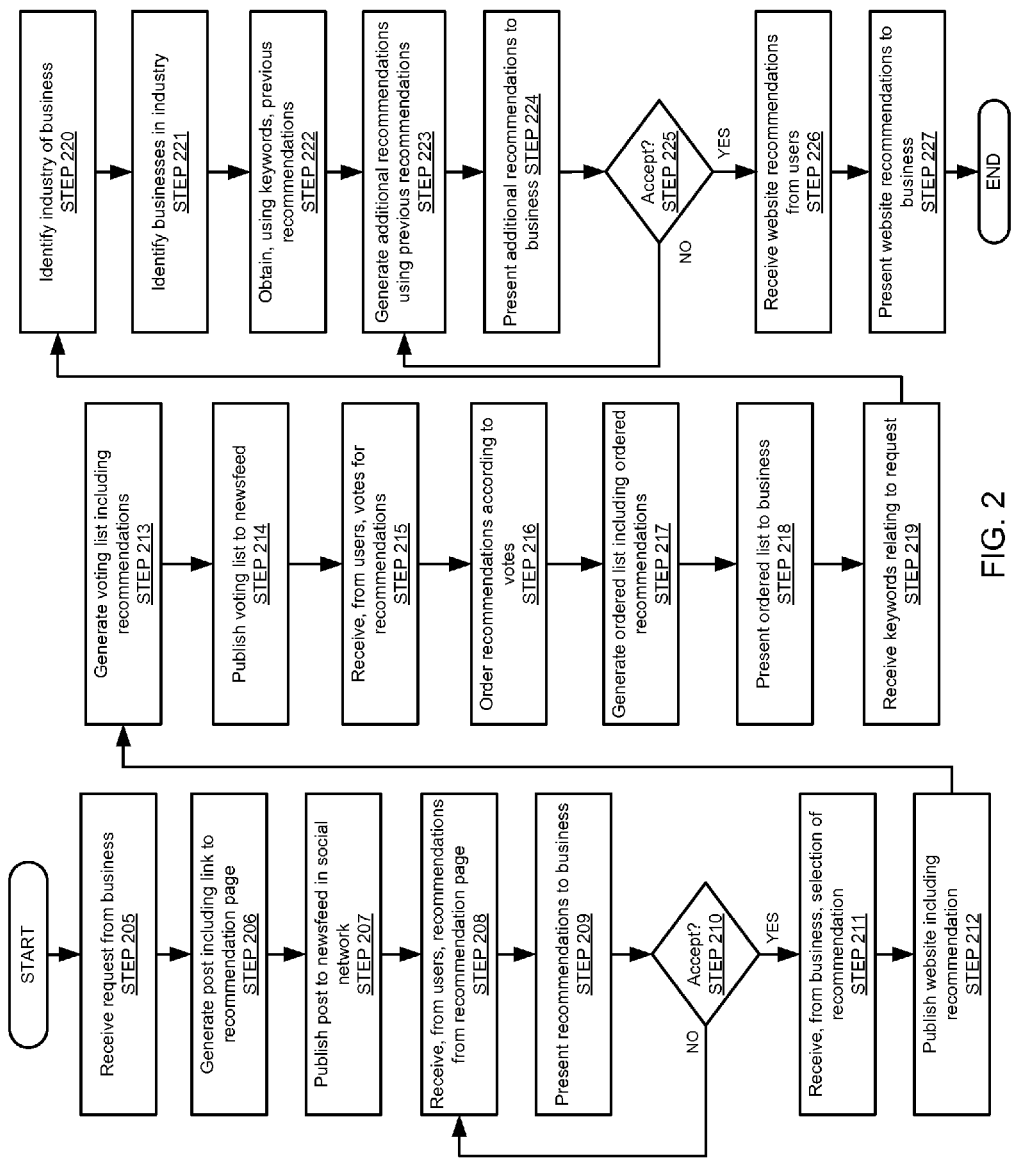
FIG. 2 shows a flowchart in accordance with one or more embodiments of the invention.
Figure 8:
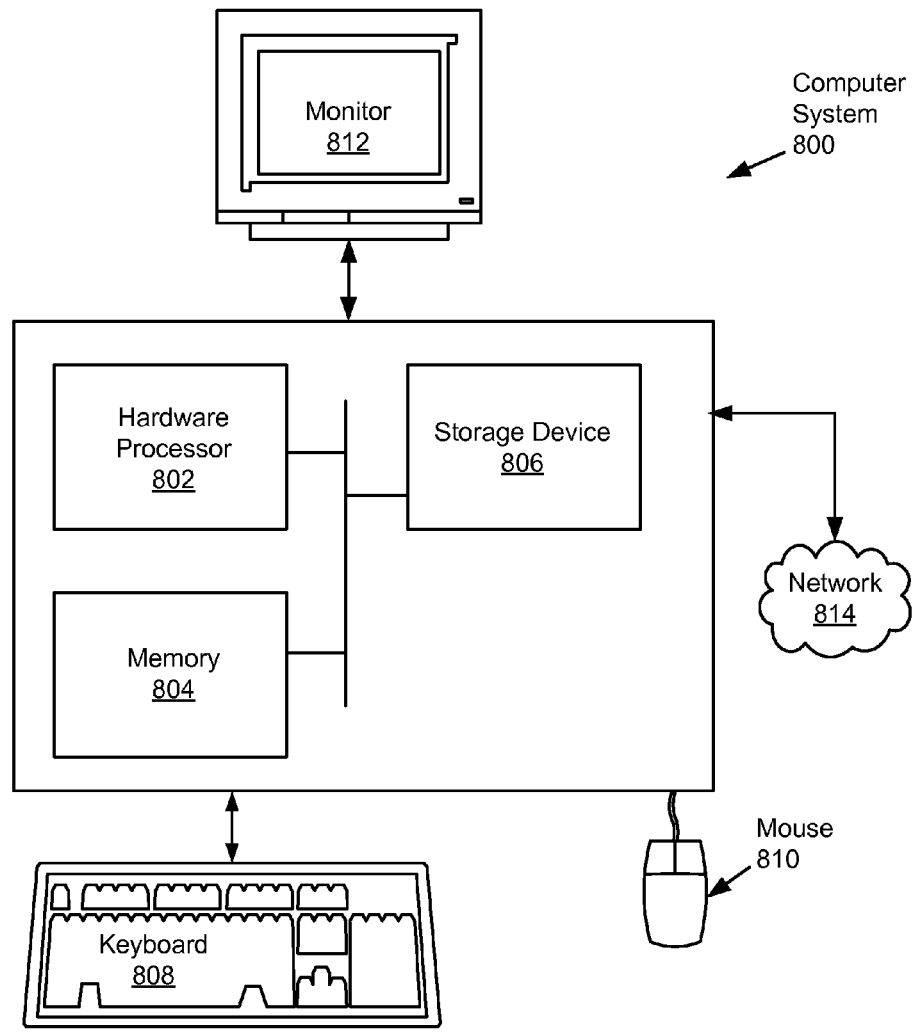
FIG. 8 shows a diagram of a computer system in accordance with one or more embodiments of the invention.

FIG. 2 shows a flowchart in accordance with one or more embodiments of the invention. The process shown in FIG. 2 may publish a website using, for example, the system (100)

shown in FIG. 1 described above and/or performed on the particular machine (i.e. computer system) shown in FIG. 8 described below. The sequence of steps shown in FIG. 2 may differ among embodiments of the invention, and one or more of the steps may be performed in parallel and/or may be optional. Accordingly, the scope of the invention should not be considered limited to the specific arrangement of steps shown in FIG. 2.

In STEP 205, a request is received from a business. The request may be received, for example, from a business interacting with the social website publishing application over a computer, mobile device, or any other capable device. The request may include specific elements of a website that the business wishes to receive recommendations for (e.g. tagline, description, domain name, search terms, products, review, logo).

In STEP 206, a post is generated. The post may include a link to a recommendation page. The post may include, for example, a picture of the business's logo and/or the business owner, as well as a description written by the business and/or the system requesting help with the business's website.

In STEP 207, the post is published to a newsfeed in a social network. The newsfeed may have, for example, various other posts that have been posted by the business and/or the system in the past. The newsfeed is a mechanism for the business to distribute messages to a user base (i.e. followers).

In STEP 208, recommendations of users are received from a recommendation web page or similar mechanism within a social network. Recommendations may include, for example, content relating to elements of a website that the business wishes to receive recommendations for (e.g. tagline, description, domain name, search terms, products, review, logo, colors, templates, formatting, placement).

In STEP 209, the recommendations are presented to a business. The recommendations may be presented to the business through the system on any device used by the business (e.g. mobile phone, computer, tablet). The recommendations are presented in their entirety to the business, so that the business may select one or more of the recommendations to incorporate into its website.

In STEP 210, a determination is made by the business to accept one or more recommendations and proceed to STEP 211 or not accept one or more recommendations and return to STEP 208 to wait for additional recommendations from the recommendation page.

In Step 211, a selection of a recommendation is received from the business. The business may select one or more of the recommendations to incorporate into the website of the business, in order to make the website more effective and efficient as a marketing and distribution tool.

In STEP 212, a website including the recommendation is published. The website may be published by the system to the Internet. The website includes all of the content of the recommendation that was selected by the business.

In STEP 213, a voting list including recommendations is generated. This may occur, for example, before or after the recommendations are presented to the business. The voting list may be generated in order to obtain a high level view on the opinions of users regarding the recommendations. Further, the voting list may also be populated with content generated by the business and/or the system, in order for the business to obtain insights into the opinions (e.g. comments) of users in the social network on options for content.

In STEP 214, the voting list is published to a newsfeed. The newsfeed may be displayed in the same manner as in STEP 207.

In STEP 215, votes for the recommendations in the voting list are received from users in a social network. The votes may be tallied according to recommendations, according to users (e.g. status, importance according to a demographic metric), or any other metric.

In STEP 216, the recommendations are ordered according to the votes. The ordering may be based on the highest number of votes, the votes submitted in the shortest time period, weights assigned to the voters indicating importance of the voters, or any other relevant metric. For example, ordering may be based on weights assigned to users relating to a demographic metric (e.g. an age, a gender, a race, a home ownership status, an employment status, an income, a location, a purchase history, a purchase rank).

In STEP 217, an ordered list including the ordered recommendations is generated. The ordered list may be arranged according to the ordering scheme determined in STEP 216.

In STEP 218, the ordered list is presented to a business. The ordered list may be presented to the business through the system on any device used by the business (e.g. mobile phone, computer, tablet). Once the business has received the ordered list, the business may select those recommendations from the ordered list that the business regards as the most effective to improve the website.

In STEP 219, keywords relating to a request are received. The keywords may be any terms that relate to the request. For example, the keywords may relate to the content of the request (e.g. tagline, description, domain name, search terms, products, review, logo).

In STEP 220, an industry of a business is identified. The industry of the business is the market in which the business operates. For example, it may be determined that the industry of the business is tourism.

In STEP 221, businesses in the industry are identified. Specifically, other comparable businesses in the same industry as the business (e.g. tourism) are identified.

In STEP 222, previous recommendations are obtained using the keywords. For instance, previous recommendations of the comparable businesses in the same industry as the business may be obtained. Those skilled in the art will appreciate that the previous recommendations may be obtained for businesses that are comparable to the business in ways other than the industry. For example, the businesses may be in the same geographic location, in the same city, of the same size in terms of employees, of the same size in terms of revenues, and so forth.

In STEP 223, additional recommendations are generated using the previous recommendations. The recommendations may be generated, for example, by identifying specific content in the previous recommendations, and by extracting such content.

In STEP 224, the additional recommendations are presented to a business. The recommendations may be presented to the business through the system on any device used by the business (e.g. mobile phone, computer, tablet). Once the business has received the recommendations, the business may select those recommendations that the business regards as the most effective to improve the website.

In STEP 225, a determination is made by the business to accept one or more additional recommendations and proceed to STEP 226 or not accept one or more recommendations and return to STEP 223 to wait for additional recommendations using the previous recommendations.

In STEP 226, one or more website recommendations are received from users of a social network. In other words, one or more website recommendations may be received from the users of the social network without the business sending a request for the recommendations. Further, example of other websites that the users in the social network find to be effective websites may be part of the recommendations.

In STEP 227, one or more website recommendations are presented to a business. One or more website recommendations may be presented to the business through the system on any device used by the business (e.g. mobile phone, computer, tablet).

In one or more embodiments of the invention, the recommendations may be obtained from users in the social network periodically, without intervention of the business. Subsequently, the website of the business may be modified using the recommendations, also without the intervention of the business. In this manner, the website of the business may be periodically updated and made more efficient without the intervention of the business. The periodic updating of a website of a business may eliminate the time consuming effort of a business owner updating the content of their website regularly.

Those skilled in the art will appreciate that the crowdsourcing of content generation for a website of a business may make the website more effective. Further, the aggregation of recommendations from different users, and allowing the business to approve, disapprove, and/or edit the proposed changes to the website (i.e. the recommendations) may make the website more effective.

Figure 3:
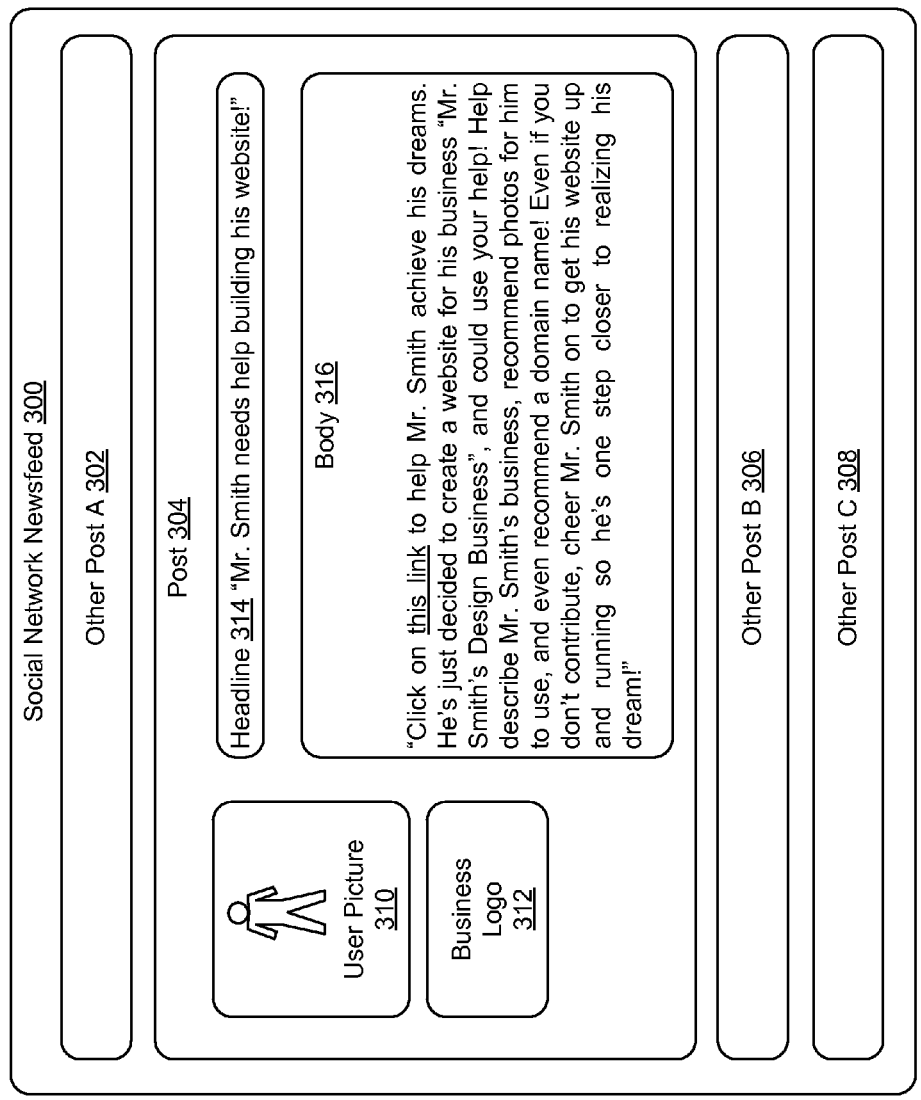

FIG. 3 shows a social network newsfeed in accordance with one or more embodiments of the invention. The social network newsfeed shown in FIG. 3 may be used, for instance, with the system (100), to publish a website. The elements shown in FIG. 3 may differ among embodiments of the invention, and one or more of the elements may be optional.

In FIG. 3, a social network newsfeed (300) is displayed. The social network newsfeed (300) is a newsfeed that exists in a social network, and includes various posts such as other post A (302), post (304), other post B (306), and other post C (308). The posts are features of the social network newsfeed (300), posted to the social network newsfeed (300) by a business or the system, that contain various information. For example, post (304) contains a user picture (310) that displays an image related to the business (or other entity) associated with the post (304), a business (or entity) logo (312), a headline (314), and a body (316). The headline (314) contains text that described the contents of the post (e.g. "Mr. Smith needs help building his website!").

The body (316) contains text, images, and/or other descriptive matter that communicate a message about the business (or entity) and/or the website of the business (or entity). For example, the business (or entity) may want to enlist the aid of followers of the social network newsfeed (300) through the post (304), and can express this message through the body (316) of the post (304). For example, the body (316) of the post (304) may contain the following text—"click on this link to help Mr. Smith achieve his dreams. He's just decided to create a website for his business 'Mr. Smith's Design Business', and could use your help! Help describe Mr. Smith's business, recommend photos for him to use, and even recommend a domain name! Even if you don't contribute, cheer Mr. Smith on to get his website up and running so he's one step closer to realizing his dream!" The link in the body (316) may refer to a recommendation page, where a user (i.e. follower of the social network newsfeed (300)) may submit feedback on the content of a website (e.g. existing or not). Those skilled in the art will appreciate that there may be various other elements in a post of a social network newsfeed.

FIG. 4 shows a recommendation page in accordance with one or more embodiments of the invention. The recommendation page shown in FIG. 4 may be used, for instance, with the system (100), to publish a website. The elements shown in FIG. 4 may differ among embodiments of the invention, and one or more of the elements may be optional.

In FIG. 4, a recommendation page (400) is displayed. The recommendation page (400) is a website page and/or a page within a social network that contains various text and form fields. The text is meant to be read by followers of the social network newsfeed of a business, and the form fields are meant to be filled out (i.e. completed) by those followers (i.e. users), in the effort to help the business generate a website with effective content, or modify a website to include more effective content than a previous version. The recommendation page contains various elements, including an introductory text that describes the goal of the recommendation page (400) to a user and provides information about the recommendation page (400), and various fields including field A (402), field B (404), field C (406), field D (408), field E (410), field F (412), field G (414), and field H (416), each of which is preceded by text that ask a question to a user and/or describes desired input from a user. Each field may be filled out (i.e. completed) with text by a user, in the effort to answer the question preceding the field.

The introductory text (e.g. at the top of recommendation page (400)) may contain any message that instructs a user to provide information in the rest of the recommendation page (400), such as "Jeremy, you can really help Mr. Smith out. By completing the following form, you'll give Mr. Smith sweet ideas for his website and get him that much closer to publishing his site. You can be proud of the fact that you helped Mr. Smith get his site up and running! Complete the following fields and Mr. Smith will be sent your recommendations!" The introductory text may address a user by his first, last or full name, and may act as an introduction to the rest of the recommendation page (400).

Field A (402) may contain text asking the user a question, such as "in 3-5 sentences, how would you describe Mr. Smith's business?". A user may fill out field A (402) with a response (i.e. text) to this inquiry. For example, the user may write "Mr. Smith's business provides great products at a reasonable price. Mr. Smith's business has always provided excellent customer service. Mr. Smith's business is a top provider of design solutions for consumers." in field A (402).

Field B (404) may contain text asking the user a question, such as "what should the tagline of Mr. Smith's business be?". A user may fill out field B (404) with a response (i.e. text) to this inquiry. For example, the user may write "Mr. Smith's business: where top design meets affordability!" in field B (404).

Field C (406), field D (408), and field E (410) may contain text asking the user a question, such as "what should Mr. Smith choose as a domain name (up to 3)?". A user may fill out field C (406), field D (408), and field E (410) with responses (i.e. text) to this inquiry. For example, the user may write "www.mrsmithsbusiness.com," "http://www.mrsmithsdesignwarehouse.com," and "http://www.topaffordabledesigns.com" in field C (406), field D (408), and field E (410), respectively.

Field F (412) may contain text asking the user a question, such as "what terms would you use to search for Mr. Smith's business in a search engine?". A user may fill out field F (412) with a response (i.e. text) to this inquiry. For example, the user may write "design, affordable, high end, discount, modern, sleek, Mr. Smith" in field F (412).

Field G (414) may contain text asking the user a question, such as "what are some of your favorite products or services that Mr. Smith offers?". A user may fill out field G (414) with a response (i.e. text) to this inquiry. For example, the user may write "lighting, modern furniture, vases, artwork, books, electronics, tables" in field G (414).

Field H (416) may contain text asking the user for input, such as "write a review of Mr. Smith's business:". A user may fill out field H (416) with a response (i.e. text) to this inquiry. For example, the user may write "since 1922, Mr. Smith's world famous Design Business has designed and manufactured modern accessories for the contemporary lifestyle . . . " in field H (416).

Recommendation page (400) may also ask a user to provide an image for the business (e.g. "upload an image or browse our library to select an image that best describes Mr. Smith's business"). This text may be followed by two buttons, choose file (418) and library (420), which allow the user to access a file system and choose an image file to upload to the recommendation page (400), or choose an image from a library of images that is accessible through the recommendation page (400). Those skilled in the art will appreciate that there may be various other functionalities associated with the recommendation page (400) than have been described.

Figure 5:
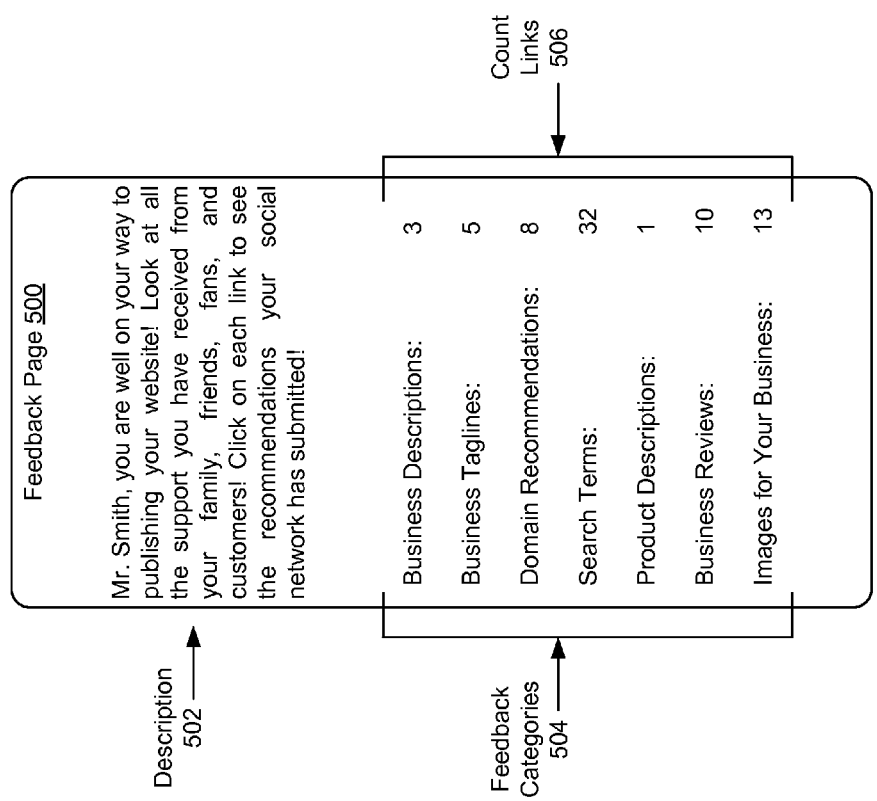

FIG. 5 shows a feedback page in accordance with one or more embodiments of the invention. The feedback page shown in FIG. 5 may be used, for instance, with the system (100), to publish a website. The elements shown in FIG. 5 may differ among embodiments of the invention, and one or more of the elements may be optional.

In FIG. 5, a feedback page (500) is displayed. The feedback page (500) is a website page and/or a page within a social network that contains various information relating to feedback to a business about its website provided by users of a social network. For example, the feedback page (500) may contain a description (502), feedback categories (504), and count links (506). The description (502) contains text describing the remaining content of the feedback page (500), such as "Mr. Smith, you are well on your way to publishing your website! Look at all the support you have received from your family, friends, fans, and customers! Click on each link to see the recommendations your social network has submitted!".

The feedback categories (506) may contain various types (i.e. categories) of feedback provided by users of a social network. For example, the feedback categories (506) may include categories such as "business descriptions," "business taglines", "domain recommendations," "search terms," "product descriptions", "business reviews", and "images for your business". Each category of the feedback categories (506) may be associated with a number of links (i.e. count links (506)). For example, there may be 3 links to business descriptions, 5 links to business taglines, 8 links to domain recommendations, 32 links to search terms, 1 link to a product description, 10 links to business reviews, and 13 links to images. When a business user clicks on these links, the user may be forwarded to a page containing subject matter of the category associated with the link. Alternatively, a subpage may be displayed within the feedback page (500) containing this information. Those skilled in the art will appreciate that there may be various components of the feedback page (500).

Figure 6:
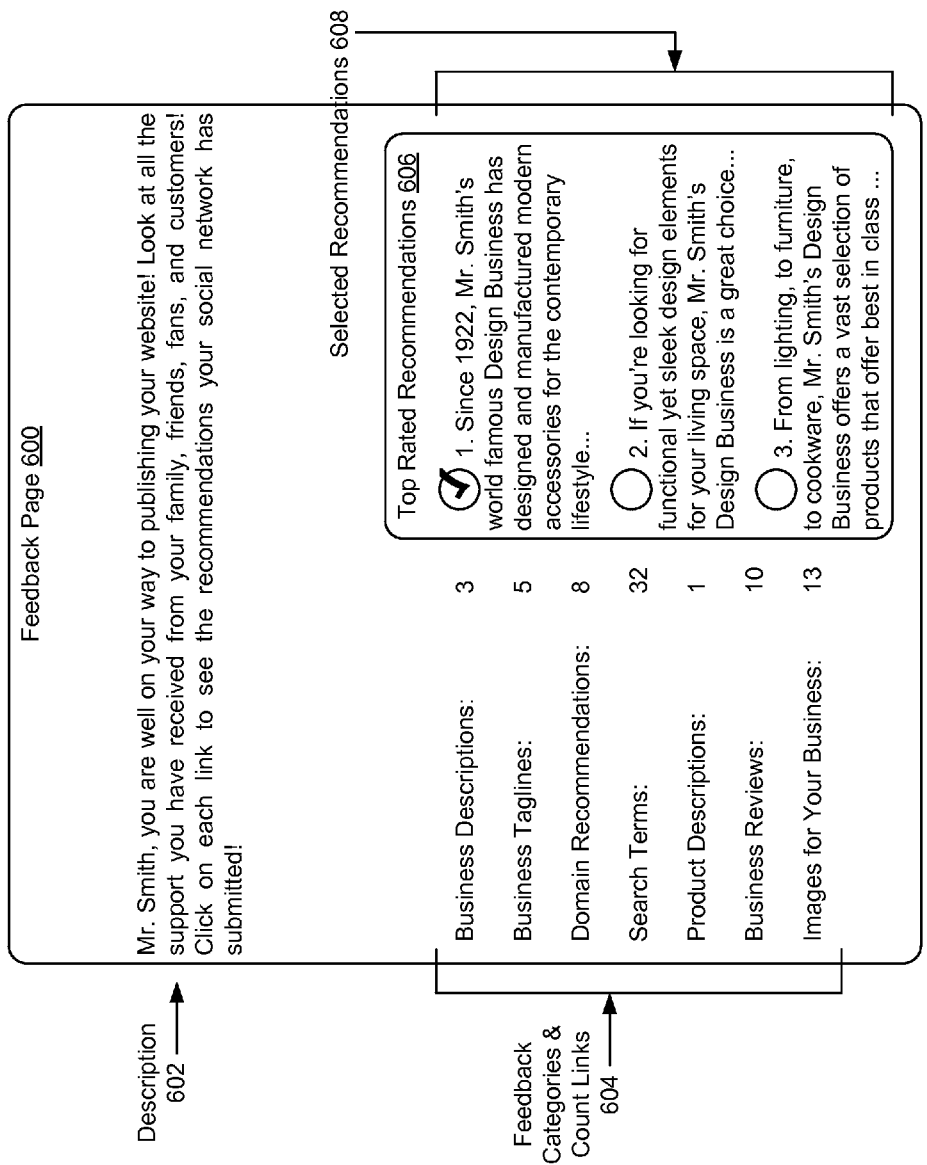

FIG. 6 shows a feedback page in accordance with one or more embodiments of the invention. The feedback page shown in FIG. 6 may be used, for instance, with the system (100), to publish a website. The elements shown in FIG. 6 may differ among embodiments of the invention, and one or more of the elements may be optional.

In FIG. 6, a feedback page (600) is displayed. The feedback page (600) may be the same or substantially similar to the feedback page (500). Just as the feedback page (500), the feedback page (600) contains a description (602), such as "Mr. Smith, you are well on your way to publishing your website! Look at all the support you have received from your family, friends, fans, and customers! Click on each link to see the recommendations your social network has submitted!". The feedback page (600) also contains feedback categories and count links (604), just as the feedback page (500) does.

The feedback page (600) also contains top rated recommendations (606), which may appear when a user clicks on a link of the count links (604). The top rated recommendations (606) is an area that is displayed after a link is clicked, and displays information pertaining to the category associated with the link. For example, the top rated recommendations (606) may contain selected recommendations (608), such as "1. Since 1922, Mr. Smith's world famous Design Business has designed and manufactured modern accessories for the contemporary lifestyle . . . ", "2. If you're looking for functional yet sleek design elements for your living space, Mr. Smith's Design Business is a great choice . . . ", and "3. From lighting, to furniture, to cookware, Mr. Smith's Design Business offers a vast selection of products that offer best in class . . . ."

Each of these selected recommendations (608) was created by a user in the social network, in order to aid the business with its website content. A business user has the option of selecting one or more of these selected recommendations (608), by clicking on the selection mechanism next to each recommendation (i.e. a checkbox, radio button, pull down menu). Once the user makes a selection of one or more of these recommendations, it may be used to generate a new version of the website for the business. In other words, the new version of the business's website will contain the recommendation that the business user selects. Those skilled in the art will appreciate that there may be other functionalities associated with the feedback page (600) that have not been described.

FIG. 7 shows an example website in accordance with one or more embodiments of the invention. The example website shown in FIG. 7 may be, for instance, published by the system (100). The elements shown in FIG. 7 may differ among embodiments of the invention, and one or more of the elements may be optional.

In FIG. 7, two websites are shown, Mr. Smith's website (700), and Mr. Smith's website (705). Mr. Smith's website (700) may be the result of the preceding examples. Specifically, Mr. Smith's website (700) may contain a recommendation that was created by a user of a social network. The recommendation may pertain, for example, to the business description of Mr. Smith's website (700). For instance, the recommendation for a business description may have been selected by a user from a business, such as "Since 1922, Mr. Smith's world famous Design Business has designed and manufactured modern accessories for the contemporary lifestyle . . . ".

Alternatively, more than one recommendation may be selected and incorporated into a website of a business. For example, in Mr. Smith's website (705), two descriptions are incorporated—"Since 1922, Mr. Smith's world famous Design Business has designed and manufactured modern accessories for the contemporary lifestyle . . . " and "If you're looking for functional yet sleek design elements for your living space, Mr. Smith's Design Business is a great choice". These two recommendations may have been created by two different users in a social network, and a combination of their recommendations may be used in Mr. Smith's website (705). Those skilled in the art will appreciate that there may be any number of recommendations that are combined for use in a website of a business.

Embodiments of the invention may be implemented on virtually any type of computer regardless of the platform being used. For example, as shown in FIG. 8, a computer system (800) includes one or more processor(s) (802), an associated memory (804) (e.g. random access memory (RAM), cache memory, flash memory, etc.), a storage device (806) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (802) is hardware. For example, the processor may be an integrated circuit. The computer system (800) may also include input means, such as a keyboard (808), a mouse (810), or a microphone (not shown). Further, the computer system (800) may include output means, such as a monitor (812) (e.g. a liquid crystal display (LCD), a plasma display, or cathode ray tube (CRT) monitor). The computer system (800) may be connected to a network (814) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (800) includes at least the minimal processing, input, and/or output means necessary to practice embodiments of the invention.

Further, in one or more embodiments of the invention, one or more elements of the aforementioned computer system (800) may be located at a remote location and connected to the other elements over a network. Further, embodiments of the invention may be implemented on a distributed system having a plurality of nodes, where each portion of the invention (e.g. request engine, post generation engine, newsfeed engine, recommendation page engine, presentation engine, selection engine, voting engine, ordering engine, keywords engine, industry engine, previous recommendations engine, and website publishing engine) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for creating a website, comprising:
receiving, from a business, a request for a website creation recommendation for content of the website;
generating, in response to receiving the request, a post comprising a name of the business, a business owner name, and a link to a website creation recommendation page;
publishing, using a social network application, the post to a newsfeed in a social network, wherein a plurality of users in the social network subscribe to the newsfeed;
receiving, in response to publishing the post and from the plurality of users, a plurality of recommendations comprising recommended content for the website from the recommendation page, wherein the plurality of recommendations are manually input by the plurality of users;
presenting, to the business, the plurality of recommendations;
receiving, from the business, a selection of one or more website creation recommendations from the plurality of recommendations;
selecting a subset of the plurality of recommendations;
presenting, to the business, the subset;
receiving, from the business, a selection of one or more additional website creation recommendations from the subset;
receiving, from the business, a plurality of content items;
generating the website creation recommendation page comprising the plurality of content items;
receiving, from the plurality of users, a plurality of votes for the plurality of content items;
ordering the plurality of content items according to the plurality of votes to generate a plurality of ordered content items;
generating a list comprising a plurality of content types relating to the plurality of ordered content items, the plurality of ordered content items, and a plurality of ranks relating to the plurality of ordered content items;
presenting, to the business, the list;
receiving, from the business, a selection of a content item from the list;
extracting, from the selection of website creation recommendations, the one or more additional website creation recommendations, and the content item, the recommended content;
generating the website comprising the recommended content to obtain a generated website; and
publishing the generated website.

2. The method of claim 1, further comprising:
receiving, from the business, a content type, wherein the request for the website creation recommendation comprises the content type.

3. The method of claim 1, wherein the recommended content is at least one selected from a group consisting of a product, a product description, a product price, a product name, a domain name, a color, a template, a business description, a business tagline, a search term, a business logo, a format, a placement of an item within the website, and a location of the item within the website.

4. The method of claim 1, further comprising:
receiving, from the plurality of users, a plurality of comments relating to the plurality of content items; and
presenting, to the business, the plurality of comments.

5. The method of claim 1, further comprising:
generating, for the plurality of users, a voting list comprising the plurality of recommendations, a plurality of voting items, and a plurality of comment items;
publishing, to the newsfeed, the voting list;
receiving, from the plurality of users, a plurality of votes and a plurality of comments relating to the plurality of recommendations in the list;
ordering the plurality of recommendations according to the plurality of votes and the plurality of comments to generate a plurality of ordered recommendations;
generating, for the business, an ordered list comprising the plurality of ordered recommendations; and
presenting, to the business, the ordered list.

6. The method of claim 1, further comprising:
receiving, from the plurality of users, a plurality of websites that the plurality of users recommend; and
presenting, to the business, the plurality of websites.

7. The method of claim 1, further comprising:
receiving, from the business, a demographic metric;
assigning, using the demographic metric, a plurality of weights to the plurality of recommendations;
ordering the plurality of recommendations based on the plurality of weights to generate a plurality of ordered recommendations;
generating, for the business, an ordered list comprising the plurality of ordered recommendations; and
presenting, to the business, the ordered list.

8. The method of claim 7, wherein the demographic metric is selected from a group consisting of an age, a gender, a race, a home ownership status, an employment status, an income, a location, a purchase history, and a purchase rank.

9. The method of claim 1, further comprising:
receiving, from the business, a plurality of keywords relating to the request;
identifying an industry of the business;
identifying a plurality of businesses in the industry; and
obtaining, using the plurality of keywords, a plurality of previous recommendations relating to a plurality of websites of the plurality of businesses, wherein the plurality of recommendations are based on the plurality of previous recommendations.

10. The method of claim 9, further comprising:
receiving, from the business, a plurality of keywords relating to the request;
identifying a location of the business;
identifying a plurality of businesses within a range of the location; and
obtaining, using the plurality of keywords, a plurality of previous recommendations relating to a plurality of websites of the plurality of businesses, wherein the plurality of recommendations are based on the plurality of previous recommendations.

11. The method of claim 1, further comprising:
extracting, from a first recommendation of the plurality of recommendations, a first recommendation item;
extracting, from a second recommendation of the plurality of recommendations, a second recommendation item;
generating a mixed recommendation item comprising the first recommendation item and the second recommendation item;
presenting, to the business, the mixed recommendation item; and
receiving, from the business, an approval of the mixed recommendation item,
wherein the recommended content is further extracted from the mixed recommendation item.

12. The method of claim 1, further comprising:
receiving, from the business, an edited recommendation based on the one or more website recommendations,
wherein the recommended content is further extracted from the edited recommendation.

13. The method of claim 1, further comprising:
receiving, from the business, an approval to publish the website without an intervention from the business; and
generating, after receiving the approval, a second recommendation based on the plurality of recommendations,
wherein the website comprising the second recommendation is published without the intervention from the business, and
wherein the recommended content is further extracted from the second recommendation.

14. A system for creating a website, comprising:
a processor;
a social website publishing application executing on the processor and configured to:
receive, from a business, a request for a website creation recommendation for content of the website;
generate, in response to receiving the request, a post comprising a name of the business, a business owner name, and a link to a website creation recommendation page;
publish, using a social network application, the post to a newsfeed in a social network, wherein a plurality of users in the social network subscribe to the newsfeed;
receive, in response to publishing the post and from the plurality of users, a plurality of recommendations comprising recommended content for the website from the recommendation page, wherein the plurality of recommendations are manually input by the plurality of users;
present, to the business, the plurality of recommendations;
receive, from the business, a selection of one or more website creation recommendations from the plurality of recommendations;
select a subset of the plurality of recommendations;
present, to the business, the subset;
receive, from the business, a selection of one or more additional website creation recommendations from the subset;
receive, from the business, a plurality of content items;
generate the website creation recommendation page comprising the plurality of content items;
receive, from the plurality of users, a plurality of votes for the plurality of content items;
order the plurality of content items according to the plurality of votes to generate a plurality of ordered content items;
generate a list comprising a plurality of content types relating to the plurality of ordered content items, the plurality of ordered content items, and a plurality of ranks relating to the plurality of ordered content items;
present, to the business, the list;
receiving, from the business, a selection of a content item from the list;
extract, from the selection of website creation recommendations, the one or more additional website creation recommendations, and the content item, the recommended content;
generate the website comprising the recommended content to obtain a generated website; and
publish the generated website.

15. The system of claim 14, wherein the social website publishing application is further configured to:
generate, for the plurality of users, a voting list comprising the plurality of recommendations, a plurality of voting items, and a plurality of comment items;
publish, to the newsfeed, the voting list;
receive, from the plurality of users, a plurality of votes and a plurality of comments relating to the plurality of recommendations in the list;
order the plurality of recommendations according to the plurality of votes and the plurality of comments to generate a plurality of ordered recommendations;

generate, for the business, an ordered list comprising the plurality of ordered recommendations; and present, to the business, the ordered list.

16. The system of claim 14, wherein the social website publishing application is further configured to:
receive, from the business, a demographic metric;
assign, using the demographic metric, a plurality of weights to the plurality of recommendations;
order the plurality of recommendations based on the plurality of weights to generate a plurality of ordered recommendations;
generate, for the business, an ordered list comprising the plurality of ordered recommendations; and
present, to the business, the ordered list.

17. The system of claim 14, wherein the social website publishing application is further configured to:
receive, from the business, a plurality of keywords relating to the request;
identify an industry of the business;
identify a plurality of businesses in the industry; and
obtain, using the plurality of keywords, a plurality of previous recommendations relating to a plurality of websites of the plurality of businesses, wherein the plurality of recommendations are based on the plurality of previous recommendations.

18. A non-transitory computer readable storage medium storing instructions for creating a website, the instructions executable on a processor and comprising functionality for:
receiving, from a business, a request for a website creation recommendation for content of the website;
generating, in response to receiving the request, a post comprising a name of the business, a business owner name, and a link to a recommendation page;
publishing, using a social network application, the post to a newsfeed in a social network, wherein a plurality of users in the social network subscribe to the newsfeed;
receiving, in response to publishing the post and from the plurality of users, a plurality of recommendations comprising recommended content for the website from the recommendation page, wherein the plurality of recommendations are manually input by the plurality of users;
presenting, to the business, the plurality of recommendations;
receiving, from the business, a selection of one or more website creation recommendations from the plurality of recommendations;
selecting a subset of the plurality of recommendations;
presenting, to the business, the subset;
receiving, from the business, a selection of one or more additional website creation recommendations from the subset;
receiving, from the business, a plurality of content items;
generating the website creation recommendation page comprising the plurality of content items;
receiving, from the plurality of users, a plurality of votes for the plurality of content items;
ordering the plurality of content items according to the plurality of votes to generate a plurality of ordered content items;
generating a list comprising a plurality of content types relating to the plurality of ordered content items, the plurality of ordered content items, and a plurality of ranks relating to the plurality of ordered content items;
presenting, to the business, the list;
receiving, from the business, a selection of a content item from the list;
extracting, from the selection of website creation recommendations, the one or more additional website creation recommendations, and the content item, the recommended content;
generating the website comprising the recommended content to obtain a generated website; and
publishing the generated website.

19. The non-transitory computer readable storage of claim 18, the instructions further comprising functionality for:
receiving, from the business, a plurality of keywords relating to the request;
identifying an industry of the business;
identifying a plurality of businesses in the industry; and
obtaining, using the plurality of keywords, a plurality of previous recommendations relating to a plurality of websites of the plurality of businesses, wherein the plurality of recommendations are based on the plurality of previous recommendations.

20. The non-transitory computer readable storage of claim 18, the instructions further comprising functionality for:
extracting, from a first recommendation of the plurality of recommendations, a first recommendation item;
extracting, from a second recommendation of the plurality of recommendations, a second recommendation item;
generating a mixed recommendation item comprising the first recommendation item and the second recommendation item;
presenting, to the business, the mixed recommendation item; and
receiving, from the business, an approval of the mixed recommendation item,
wherein the recommended content is further extracted from the mixed recommendation item.

21. The non-transitory computer readable storage of claim 18, the instructions further comprising functionality for:
receiving, from the business, an approval to publish the website without an intervention from the business; and
generating, after receiving the approval, a second recommendation based on the plurality of recommendations,
wherein the generated website is published without the invention from the business, and
wherein the recommended content is further extracted from the second recommendation.

* * * * *